United States Patent
Fujita

(10) Patent No.: US 11,528,415 B2
(45) Date of Patent: Dec. 13, 2022

(54) IMAGING APPARATUS, METHOD OF CONTROLLING IMAGING APPARATUS, AND STORAGE MEDIUM

(71) Applicant: CANON KABUSHIKI KAISHA, Tokyo (JP)

(72) Inventor: Yusuke Fujita, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/575,136

(22) Filed: Jan. 13, 2022

(65) Prior Publication Data

US 2022/0232171 A1 Jul. 21, 2022

(30) Foreign Application Priority Data

Jan. 19, 2021 (JP) ............... JP2021-006302

(51) Int. Cl.
*H04N 5/232* (2006.01)

(52) U.S. Cl.
CPC ... *H04N 5/232411* (2018.08); *H04N 5/23212* (2013.01)

(58) Field of Classification Search
CPC ...................... H04N 5/232411; H04N 5/23212
See application file for complete search history.

(56) References Cited

U.S. PATENT DOCUMENTS

2015/0276942 A1* 10/2015 Roos ................ H04N 5/232411
  250/394
2016/0080652 A1* 3/2016 Shirota ............ H04N 5/232411
  348/222.1
2016/0360107 A1* 12/2016 Nabeshima ........ H04N 5/23203

FOREIGN PATENT DOCUMENTS

| JP | 2007336117 A | 12/2007 |
| JP | 2008140405 A | 6/2008 |
| JP | 2019024259 A | 2/2019 |
| KR | 20150041943 A * | 4/2015 |

OTHER PUBLICATIONS

English translation of KR 20150041943 A. (Year: 2015).*

* cited by examiner

*Primary Examiner* — Shahbaz Nazrul
(74) *Attorney, Agent, or Firm* — Canon U.S.A., Inc. IP Division

(57) ABSTRACT

In a case where an imaging apparatus is standing by for a series of image-capturing processes, when a predetermined period of time elapses while the imaging apparatus operates in a fast-return enabled state where image-capturing can be performed immediately, the imaging apparatus shifts from the fast-return enabled state to a power saving state where power consumption is reduced as compared with the fast-return enabled state. An adjustment item is set to auto in the fast-return enabled state, and operation for adjusting the adjustment item is stopped in the power saving state. When returning to a state where the series of image-capturing processes is enabled, the adjustment item is maintained as auto if the imaging apparatus is in the fast-return enabled state, and the adjustment item is returned to a setting value before shifting to the standby state if the imaging apparatus is in the power saving state.

9 Claims, 7 Drawing Sheets

IMAGING APPARATUS, METHOD OF CONTROLLING IMAGING APPARATUS, AND STORAGE MEDIUM

BACKGROUND

Field of the Disclosure

The present disclosure relates to an imaging apparatus, a method of controlling the imaging apparatus, and a storage medium.

Description of the Related Art

In recent years, monitoring camera systems utilizing networks have become widespread.

The monitoring camera systems are used in a wide range of fields including large-scale public institutions and small stores, and there are various types of methods of operating the systems. In particular, a monitoring camera utilizing a network is called a network camera. There are network cameras having various functional characteristics to match operation forms. Examples of such cameras include a network camera that can freely change an image-capturing direction for panning and tilting, and a box-shaped network camera that cannot change the image-capturing direction but can perform high-magnification zooming image-capturing.

As a new use case of such a network camera, there is a case where the network camera is used for image-capturing in a television studio, rather than for monitoring, and the number of such cases has been increasing. In a case where the network camera is used in such a use case, it is necessary that a function of an existing television camera be also included in the network camera.

For example, a standby state is a representative unique function of the existing television camera. The standby state is a state where the television camera is standing by for image-capturing, and the television camera gives a notification to a user by a tally light to notify a producer or a cast member of a television program that the television camera is not capturing an image. In the standby state, imaging is not usually performed either, from the viewpoint of power saving. Accordingly, in order to enable the imaging to start again when cancelling the standby state, it is necessary to make imaging-related settings anew, and thus it takes a long time before a series of image-capturing processes can be performed.

Some techniques have been discussed to achieve both of enabling image-capturing to start immediately when an imaging apparatus returns from a standby state to an image-capturing state, and reducing power consumption in the standby state. For example, Japanese Patent Application Laid-Open No. 2007-336117 discusses a related technique. According to this technique, when a standby state is cancelled after an imaging apparatus is shifted to the standby state, an exposure amount for an image sensor is increased to reduce the time taken before an image of an object is focused, so that the time taken before the start of image-capturing is reduced. Meanwhile, Japanese Patent Application Laid-Open No. 2019-24259 discusses another related technique. According this technique, in an interchangeable-lens imaging apparatus, settings such as focus and aperture settings at the time when a lens is attached are recorded when the lens is detached, and the settings are reflected in the imaging apparatus when the lens is attached again.

However, in the technique discussed in Japanese Patent Application Laid-Open No. 2007-336117 described above, although the time taken before the image is focused is reduced by increasing the exposure amount for the image sensor, it is necessary to adjust the focus and aperture settings afterward, which makes it difficult to sufficiently reduce the time taken before the series of image-capturing processes can actually start. Moreover, in the technique discussed in Japanese Patent Application Laid-Open No. 2019-24259, in a case where an object or environment information such as a lighting environment has changed when the lens is attached again, it is necessary to adjust the focus and aperture settings of the imaging apparatus again. In such a case, it takes a long time before the series of image-capturing processes can start.

SUMMARY

The present disclosure is directed to making it possible to shift an imaging apparatus from a standby state to a state where image-capturing can be immediately performed, and to reduce power consumption.

According to an aspect of the present disclosure, an imaging apparatus including an imaging unit that images an object includes a setting unit configured to return the imaging apparatus from a standby state, which is a state before start of a series of image-capturing processes, to a state where the series of image-capturing processes is enabled, a control unit configured to bring the imaging apparatus into a return enabled state where setting of the imaging apparatus is continuously performed depending on an environment of the object, in the standby state, and a shift unit configured to shift the imaging apparatus from the return enabled state to a power saving state where power consumption is reduced as compared with the return enabled state, in the standby state, wherein the shift unit shifts the imaging apparatus to the power saving state, in a case where a predetermined period of time elapses after the imaging apparatus is brought into the return enabled state by the control unit.

Further features of the present disclosure will become apparent from the following description of exemplary embodiments with reference to the attached drawings.

DESCRIPTION OF THE EMBODIMENTS

Figure 1:
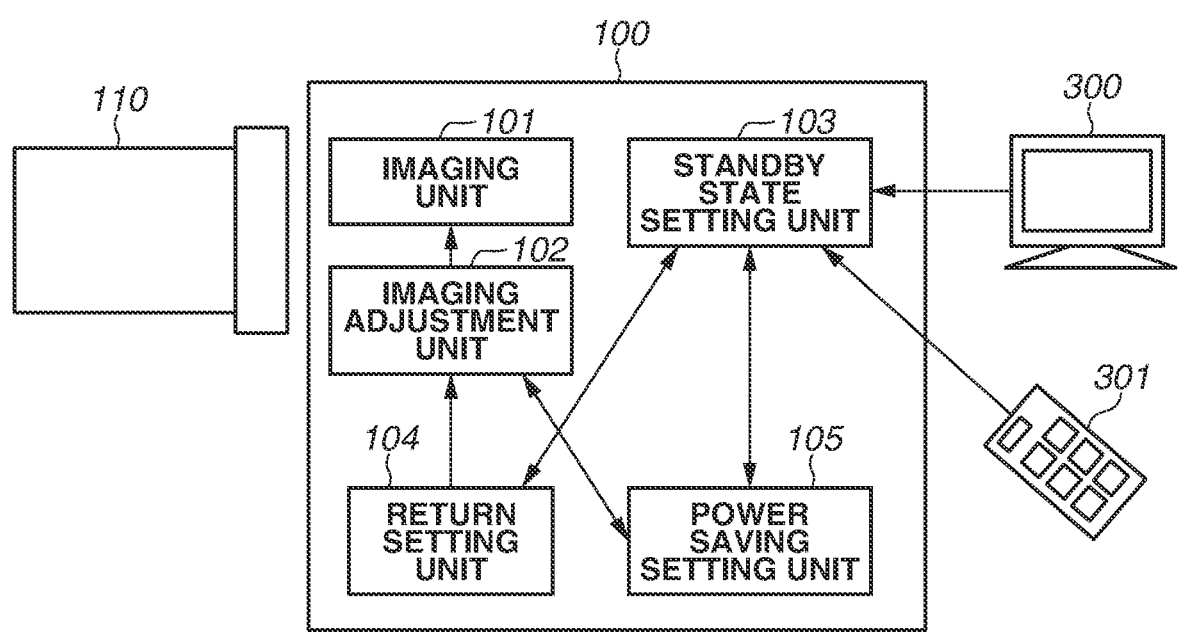
FIG. 1 is a block diagram illustrating an example of an internal configuration of an imaging apparatus according to an exemplary embodiment.
Figure 3:
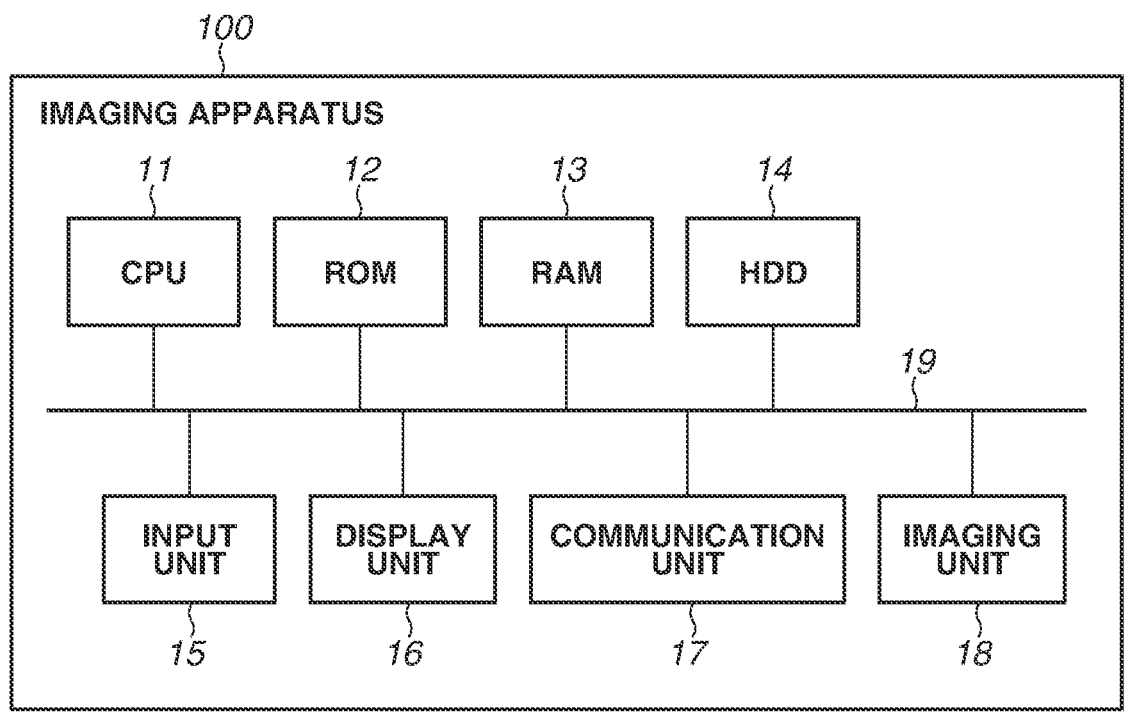
FIG. 3 is a block diagram illustrating an example of a hardware configuration of the imaging apparatus according to one or more aspects of the present disclosure.

Exemplary embodiments of the present disclosure will be described in detail below with reference to the attached drawings. FIG. 1 is a block diagram illustrating an example of an internal configuration of an imaging apparatus 100 according to an exemplary embodiment of the present disclosure. FIG. 3 is a block diagram illustrating an example of a hardware configuration of the imaging apparatus 100. The imaging apparatus 100 includes a central processing unit (CPU) 11, a read only memory (ROM) 12, a random access memory (RAM) 13, a hard disk drive (HDD) 14, an input unit 15, a display unit 16, a communication unit 17, an imaging unit 18, and a bus 19.

The CPU 11 reads out a control program stored in the ROM 12 to execute various kinds of processing. The RAM 13 is used as a temporary memory area such as a main memory or a work area of the CPU 11. The HDD 14 stores various data and various programs. The input unit 15 includes a keyboard or a mouse, and receives various operations performed by a user. The display unit 16 displays various kinds of information.

The communication unit 17 performs processing for communicating with an external apparatus via a network. In another example, the communication unit 17 can wirelessly communicate with an external apparatus.

The CPU 11 reads out a program stored in the ROM 12 or the HDD 14 and executes this program, so that a function and processing (to be described below) of the imaging apparatus 100 are implemented. In another example, the CPU 11 can read out a program stored in a storage medium such as a secure digital (SD) card in place of the ROM 12.

In the present exemplary embodiment, one processor (the CPU 11) executes each process in a flowchart to be described below using one memory (the ROM 12) in the imaging apparatus 100, but other forms can be adopted. For example, a plurality of processors and a plurality of RAMs, ROMs, and storages can execute each process in the flowchart to be described below by operating together. A part of the processing can be executed using a hardware circuit. The function and the processing of the imaging apparatus 100 to be described below can be implemented using a processor other than the CPU (e.g., a graphics processing unit (GPU) can be used in place of the CPU).

The imaging unit 18 includes an image sensor, and converts light obtained from a lens unit 110 into an electrical signal to generate an image.

A functional configuration of the imaging apparatus 100 will be described with reference to FIG. 1. The imaging apparatus 100 is an apparatus to which the lens unit 110 can be attached, and includes an imaging unit 101, an imaging adjustment unit 102, a standby state setting unit 103, a return setting unit 104, and a power saving setting unit 105.

The imaging unit 101 develops an image formed by the imaging apparatus 100 on the image sensor through the lens unit 110. Further, the imaging unit 101 generates a video image to record the generated video image in the HDD 14, or delivers the generated video image to an external apparatus such as a personal computer (PC) 300. The imaging adjustment unit 102 adjusts a video image to be developed by the imaging unit 101. The types of adjustment item will be described below.

The standby state setting unit 103 receives an instruction to shift the imaging apparatus 100 to a standby state.

The standby state is a state before an image-capturing is enabled, and this is a state where an object is imaged but a video image is not delivered. An image-capturing execution state is a state where a series of processes, from imaging of an object to generate a video image to delivery (or recording) of the generated video image, is enabled. When the imaging apparatus 100 is brought into the standby state by the standby state setting unit 103, the return setting unit 104 brings the imaging apparatus 100 into a fast-return enabled state. The fast-return enabled state is a state where the imaging apparatus 100 is in the standby state and image-capturing can start immediately when the imaging apparatus 100 returns from the standby state to the image-capturing execution state. The details will be described below.

The power saving setting unit 105 brings the imaging apparatus 100 into a power saving state, when the imaging apparatus 100 is brought into the standby state by the standby state setting unit 103. Here, the power saving state is a state where the imaging apparatus 100 is in the standby state, the functions of the imaging apparatus 100 are in a stop state as far as possible, and the power consumption of the entire imaging apparatus 100 is reduced. The details will be described below.

The present exemplary embodiment is described above concerning the configuration, and will be further described below with reference to the functional configuration in FIG. 1.

A processing procedure of the imaging apparatus 100 according to the present exemplary embodiment will be described with reference to a flowchart in FIG. 2.

In step S200, when an instruction to shift to the standby state issued from a user side is received by the imaging apparatus 100, the standby state setting unit 103 shifts the imaging apparatus 100 to the standby state. Here, the method of issuing the instruction will be described with reference to FIG. 1.

For example, there is a technique of issuing an instruction using the PC 300, as the way of issuing the instruction from the user side to bring the imaging apparatus 100 into the standby state. In a case where the PC 300 is used, typically, the instruction is issued via an application supporting the imaging apparatus 100 or an Internet browser. The instruction can also be issued using a remote controller 301. In a case where the remote controller 301 includes a shift button for shifting to the standby state, the user can give an instruction to enter the standby state by pressing the shift button. The form of the remote controller 301 can be, for example, a type having no liquid crystal display screen and having only buttons to be operated, as with a television remote controller, or can be a terminal that a user can operate while checking a liquid crystal display screen, such as a tablet PC or a smartphone.

Upon shifting to the standby state, the imaging unit 101 stops only the delivery of a video image and continues only imaging. The video image can be displayed as a real-time video image on the display unit 16 of the imaging apparatus 100 in a state where the delivery of the video image is stopped.

Figure 4:
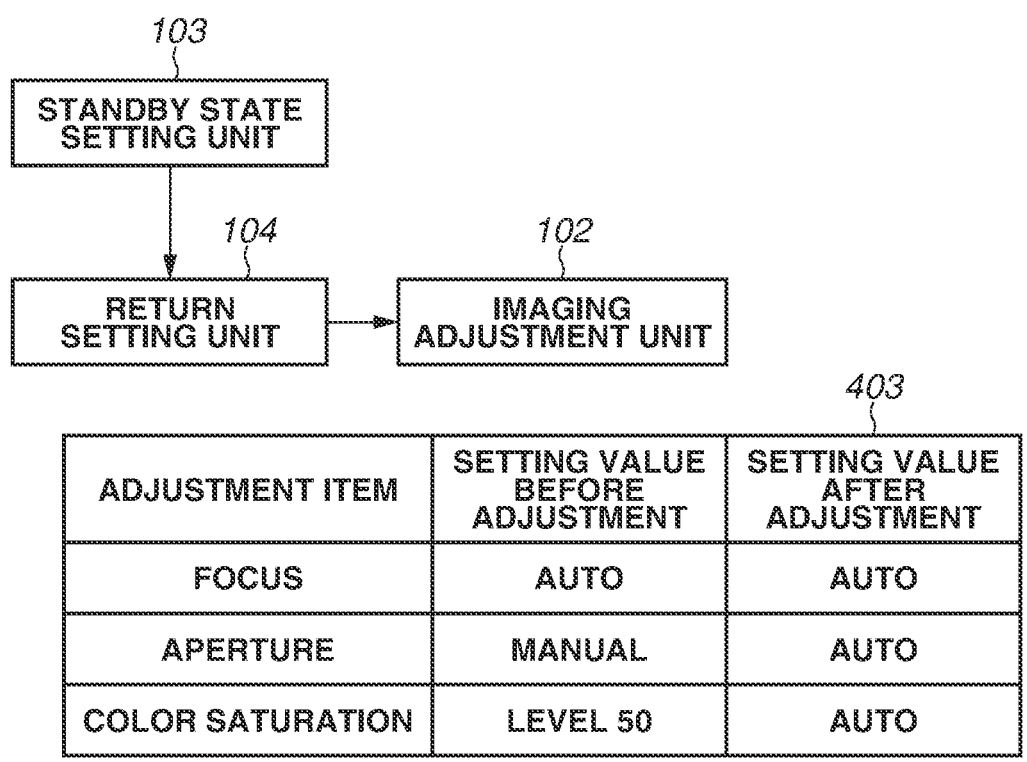
FIG. 4 is a diagram illustrating an example of a fast-return enabled state setting unit according to one or more aspects of the present disclosure.

In step 201, the standby state setting unit 103 notifies the return setting unit 104 of having shifted to the standby state. Subsequently, in step S202, upon being notified by the standby state setting unit 103, the return setting unit 104 controls the imaging adjustment unit 102 to shift the imaging apparatus 100 to the fast-return enabled state. Here, the method of notification and control will be described with reference to FIG. 4.

The standby state setting unit 103 transmits a notification to the return setting unit 104. Upon receiving the notification, the return setting unit 104 issues an instruction regarding imaging-related adjustment to the imaging adjustment unit 102. The types of the adjustment item will be described with reference to a table 403 in FIG. 4.

The table 403 includes "focus", "aperture", and "color saturation" as examples of the adjustment item, but the types of the adjustment item are not limited to these examples. A "setting value before adjustment" indicates a setting value of the imaging apparatus 100 before the instruction is issued from the return setting unit 104 to the imaging adjustment unit 102. A "setting value after adjustment" indicates a setting value of the imaging apparatus 100 after the instruction is issued from the return setting unit 104 to the imaging adjustment unit 102.

In the present exemplary embodiment, to start image-capturing immediately after the standby state is cancelled, the setting value after adjustment is set to "auto" indicating automatic setting made by the imaging apparatus 100 depending on an object, and the setting value is adjusted to be always suitable for the environment of the object. Here, the setting is carried over for the item in which the setting value before adjustment is "auto", as represented by "focus" in the table 403. In contrast, the setting is changed to "auto" for the item in which the value is a manual setting or a fixed value, as represented by "aperture" and "color saturation" in the table 403.

The setting value after adjustment may not be "auto". For example, in a case where the setting value is adjusted by "manual" for "aperture" and it is not desired to change the setting value, the setting value after adjustment can be maintained as "manual". In a case where "auto" is not present as the setting value after adjustment, the setting value before adjustment can be carried over.

In principle, imaging by the imaging unit 101 continues in the fast-return enabled state to start image-capturing immediately, but imaging by the imaging unit 101 can be stopped in the fast-return enabled state to reduce the power consumption.

In step S203, the return setting unit 104 determines whether a predetermined period of time has elapsed since the shift of the imaging apparatus 100 to the fast-return enabled state in step S202. This predetermined period of time can be a value predefined by the manufacturer of the imaging apparatus 100, or can be a setting value that the user has input from the PC 300 or the remote controller 301 when instructing the imaging apparatus 100 to shift to the standby state. Further, the predetermined period of time can be a value set beforehand by the user via the input unit 15 of the imaging apparatus 100. In a case where the return setting unit 104 determines that the predetermined period of time has elapsed (YES in step S203), the processing proceeds to step S204. In a case where the return setting unit 104 determines that the predetermined period of time has not elapsed (NO in step S203), the processing returns to step S202.

Figure 5:
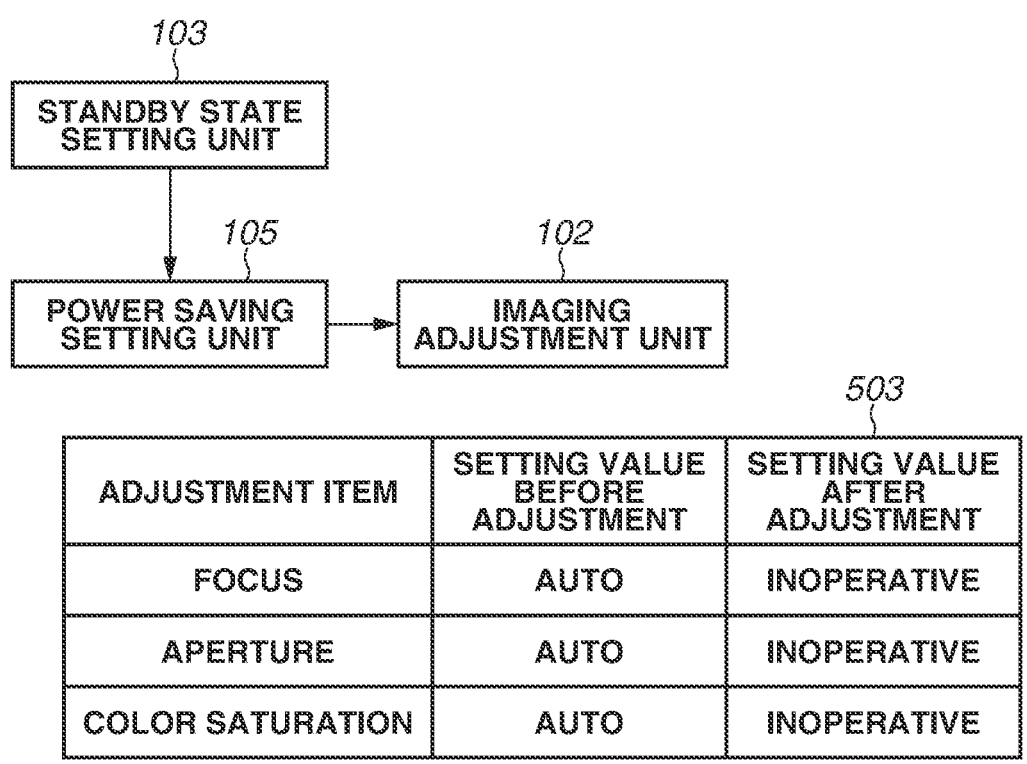
FIG. 5 is a diagram illustrating an example of a power saving state setting unit according to one or more aspects of the present disclosure.

In step S204, the standby state setting unit 103 notifies the power saving setting unit 105 that shifting to the power saving state is to be made. Subsequently, in step S205, upon being notified by the standby state setting unit 103, the power saving setting unit 105 controls the imaging adjustment unit 102 to shift the imaging apparatus 100 from the fast-return enabled state to the power saving state. Here, the method of notification and control will be described with reference to FIG. 5.

The standby state setting unit 103 transmits a notification to the power saving setting unit 105. Upon receiving the notification, the power saving setting unit 105 issues an instruction regarding imaging-related adjustment to the imaging adjustment unit 102. The types of the adjustment item will be described with reference to a table 503 in FIG. 5.

The table 503 includes "focus", "aperture", and "color saturation" as examples of the adjustment item, but the types of the adjustment item are not limited to these examples. A setting value before adjustment indicates a setting value of the imaging apparatus 100 before the instruction is issued from the power saving setting unit 105 to the imaging adjustment unit 102. A setting value after adjustment indicates a setting value of the imaging apparatus 100 after the instruction is issued from the power saving setting unit 105 to the imaging adjustment unit 102.

In the power saving state, the functions of the imaging apparatus 100 are in the stop state as far as possible, and the power consumption of the entire imaging apparatus 100 is reduced. Accordingly, the adjustment of the setting value by "auto" is set to stop after the adjustment, so that the power consumption is reduced as much as possible. In other words, the respective operations of automatically adjusting "focus", "aperture", and "color saturation" are suspended. An item other than the adjustment items that can be controlled by the imaging adjustment unit 102 can be set to the power saving state. For example, in a case where the imaging apparatus 100 is an imaging apparatus to which a pan head is attached, a pan head adjustment unit (not illustrated) for adjusting the operation of the pan head can be brought into the power saving state by limiting the operation of the pan head. Further, for example, in a case where the imaging apparatus 100 is an imaging apparatus having a function of projecting infrared light, an infrared light adjustment unit (not illustrated) for modulating the infrared light can be brought into the power saving state by limiting the projection of the infrared light. In a case where there is another setting item that the imaging apparatus 100 can utilize to further reduce the power consumption than during the normal operation, this item is set to a value for reducing the power consumption.

In principle, imaging is stopped in the power saving state to reduce the power consumption, but imaging can be continued in the power saving state, in a case where it is desired to start image-capturing as immediately as possible.

Figure 2:
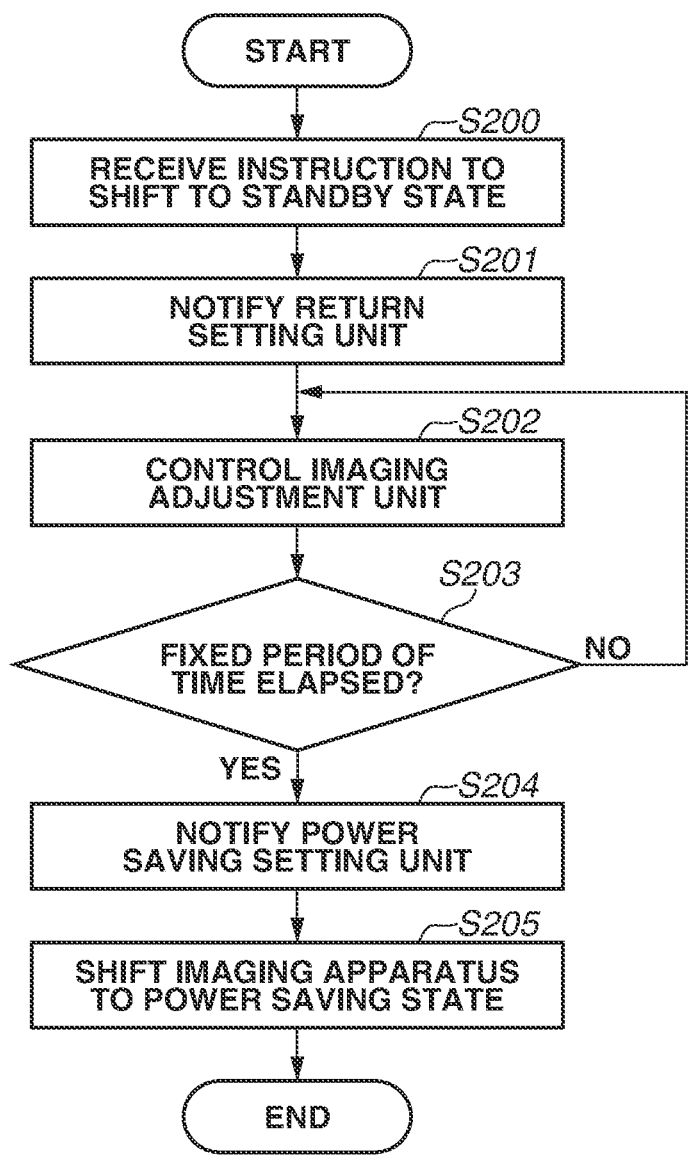
FIG. 2 is a flowchart illustrating an example of a processing procedure of the imaging apparatus according to one or more aspects of the present disclosure.

This ends the description of the processing procedure of the imaging apparatus 100 according to the present exemplary embodiment illustrated in FIG. 2.

Figure 6:
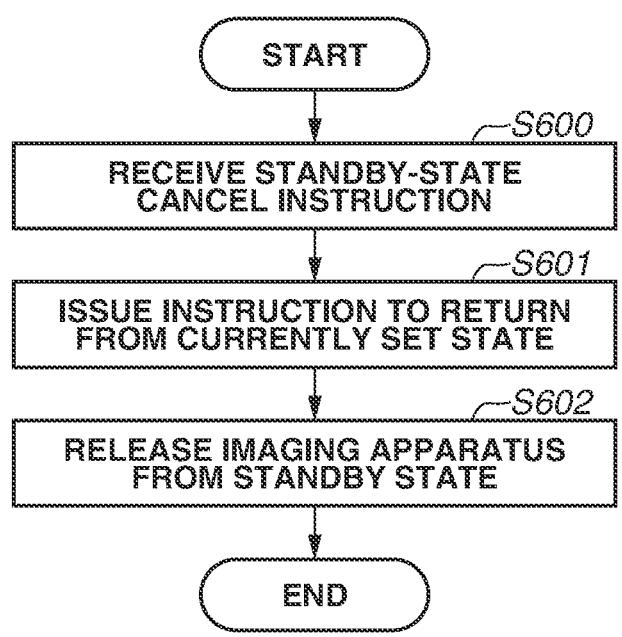
FIG. 6 is a flowchart illustrating an example of processing for returning from a standby state according to one or more aspects of the present disclosure.

Now, processing in returning the imaging apparatus 100 from the standby state to the image-capturing execution state will be described with reference to a flowchart in FIG. 6.

In step S600, the standby state setting unit 103 receives a standby-state cancel instruction issued from the user side to the imaging apparatus 100. The method of issuing the cancel instruction is similar to the above-described method for the process in which the user instructs the imaging apparatus 100 to shift to the standby state in step S200 in FIG. 2.

In step S601, the standby state setting unit 103 issues an instruction to return from a currently set state. The procedure for the instruction will be described with reference to FIG. 7. The standby state setting unit 103 issues an instruction suitable for the currently set state. For example, in a case where the imaging apparatus 100 is in the fast-return enabled state, the standby state setting unit 103 issues an instruction to the return setting unit 104. For another example, in a case where the imaging apparatus 100 is in the power saving state, the standby state setting unit 103 issues an instruction to the power saving setting unit 105. Each of these instructions will be described.

In a case where the imaging apparatus 100 is in the fast-return enabled state, upon receiving the instruction from the standby state setting unit 103, the return setting unit 104 instructs the imaging adjustment unit 102 to use a setting value after standby-state cancel of the imaging apparatus 100. For example, in a table 703 in FIG. 7, the setting value of the fast-return enabled state of each of the adjustment items is "auto", which is a value suitable for an image-capturing environment or an object at the timing of cancel, and thus, the setting value after standby-state cancel is maintained as "auto".

Figure 7:
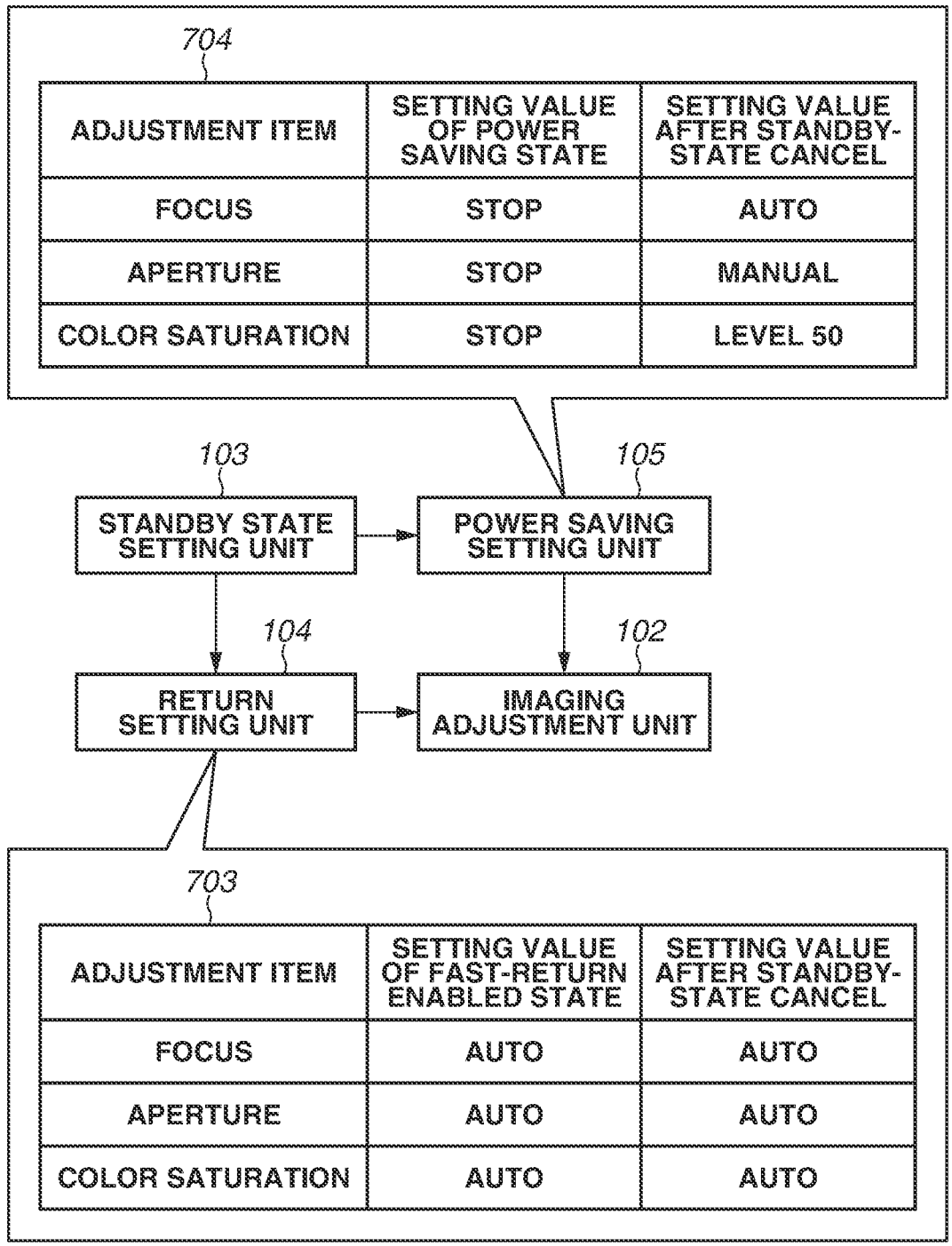
FIG. 7 is a diagram illustrating examples of setting values at the time of returning from the standby state according to one or more aspects of the present disclosure.

On the other hand, in a case where the imaging apparatus 100 is in the power saving state, upon receiving the instruction from the standby state setting unit 103, the power saving setting unit 105 instructs the imaging adjustment unit 102 to use a setting value after standby-state cancel of the imaging apparatus 100. For example, in a table 704 in FIG. 7, the setting value of the power saving state of each of the adjustment items is "stop", and thus, returning from the stop is necessary to start imaging. FIG. 7 illustrates an example in which a setting value before the imaging apparatus 100 is brought into the standby state is set as the setting value after standby-state cancel. The setting value before shifting to the standby state is an image-capturing condition in which the intention of the user is most reflected. Therefore, in the case of returning from the power saving state, it is more desirable to use the setting value before shifting to the standby state, which is a value originally set by the user, than to use the setting value for immediately starting image-capturing. However, in some cases, as represented by the time of release from the fast-return enabled state, the setting values of all the adjustment items can be "auto". These setting values are set through the imaging adjustment unit 102.

In step S602, the standby state setting unit 103 releases the imaging apparatus 100 from the standby state. Specifically, in a case where imaging is stopped, the imaging unit 101 restarts imaging and delivery of a video image. In a case where only imaging is continued, the imaging unit 101 restarts the delivery of a video image.

Some exemplary embodiments of the present disclosure are described above, but the present disclosure is not limited to these exemplary embodiments, and various modifications and changes can be made within the scope of the gist of the present disclosure.

As described above, according to the exemplary embodiments, the fast-return enabled state is maintained before the elapse of the predetermined period of time following shifting to the standby state, and thus, it is possible to immediately start image-capturing when the imaging apparatus returns from the standby state to the image-capturing execution state. Before the elapse of the predetermined period of time, there are many situations where the user desires to start image-capturing immediately. Therefore, for example, each of all the adjustment items is set to "auto", so that image-capturing can be immediately performed based on conditions suitable for an environment, even if image-capturing is restarted. After the elapse of the predetermined period of time, there are less situations where the user desires to start image-capturing immediately. Therefore, the imaging apparatus shifts to the power saving state where the power consumption is reduced as much as possible by, for example, setting all the adjustment items to "stop", so that the power consumption of the imaging apparatus can be reduced. As described above, both of the power saving and the improvement of the responsiveness of the imaging apparatus can be achieved, so that the convenience of the user improves.

According to the above-described exemplary embodiments, the imaging apparatus can be shifted from the standby state to the state where image-capturing can be immediately performed, and the power consumption can be suppressed as well.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2021-006302, filed Jan. 19, 2021, which is hereby incorporated by reference herein in its entirety.

What is claimed is:

1. An imaging apparatus comprising a processor executing instructions that, when executed by the processor, cause the processor to:
    change a state of the imaging apparatus into a return enabled state where setting of the imaging apparatus is continuously performed depending on an environment captured by the imaging apparatus, in response to receiving a user instruction; and
    change a state of the imaging apparatus from the return enabled state to a power saving state where power consumption is reduced as compared with the return enabled state, in a case where a predetermined period of time elapses after the state of the imaging apparatus is changed into the return enabled state.

2. The imaging apparatus according to claim 1,
    wherein the return enabled state is a state where imaging by the imaging unit is continued, and
    wherein the power saving state is a state where imaging by the imaging unit is stopped.

3. The imaging apparatus according to claim 1, wherein the predetermined period of time is a period of time set by a user.

4. The imaging apparatus according to claim 1, wherein adjustment process is continuously performed in the return enabled state, the adjustment process being process to make a setting value concerning image capturing process be a condition suitable for an environment captured by the imaging apparatus.

5. The imaging apparatus according to claim 4, wherein the adjustment process of the setting value is to be suspended, in a case where the imaging apparatus is changed to the power saving state.

6. The imaging apparatus according to claim 4, wherein the setting value concerning the image capturing process is changed to a setting value in the return enabled state, in a case where the imaging apparatus is to be brought into a state where a series of image-capturing processes and transmission of captured images are enabled.

7. The imaging apparatus according to claim 4, wherein the setting value concerning the image capturing process is changed to a setting value before the imaging apparatus is brought into the return enabled state, in a case where the imaging apparatus is changed from the power saving state to a state where a series of image-capturing processes and transmission of captured images are enabled.

8. A method of controlling an imaging apparatus, the method comprising:

changing a state of the imaging apparatus into a return enabled state where setting of the imaging apparatus is continuously performed depending on an environment captured by the imaging apparatus, in response to receiving a user instruction; and changing a state of the imaging apparatus from the return enabled state to a power saving state where power consumption is reduced as compared with the return enabled state, in a case where a predetermined period of time elapses after the state of the imaging apparatus is changed into the return enabled state.

9. A computer-readable non-transitory storage medium storing a program for causing a computer to execute a control method controlling an imaging apparatus, the method comprising:

changing a state of the imaging apparatus into a return enabled state where setting of the imaging apparatus is continuously performed depending on an environment captured by the imaging apparatus, in response to receiving a user instruction; and changing a state of the imaging apparatus from the return enabled state to a power saving state where power consumption is reduced as compared with the return enabled state, in a case where a predetermined period of time elapses after the state of the imaging apparatus is changed into the return enabled state.

* * * * *